United States Patent [19]

Herrington, Jr. et al.

[11] Patent Number: 5,131,121
[45] Date of Patent: Jul. 21, 1992

[54] PROTRUDING END STOPS FOR PLASTIC RECLOSABLE FASTENER

[75] Inventors: F. John Herrington, Jr., Holcomb; Eric A. St. Phillips, Fairport, both of N.Y.

[73] Assignee: Mobil Oil Corporation, Fairfax, Va.

[21] Appl. No.: 673,706

[22] Filed: Mar. 22, 1991

[51] Int. Cl.⁵ .............................. A44B 19/16
[52] U.S. Cl. .................... 24/436; 156/66; 24/400
[58] Field of Search .......... 24/436, 399, 400, 427; 156/73.1, 66, 91

[56] References Cited

U.S. PATENT DOCUMENTS

| | | | |
|---|---|---|---|
| 2,715,759 | 8/1955 | Poux | 24/427 X |
| 3,259,951 | 7/1964 | Zimmerman | 24/201 |
| 3,790,992 | 2/1974 | Herz | 24/201 |
| 3,962,007 | 6/1976 | Heimberger | 156/66 X |
| 4,787,755 | 11/1988 | Branson | 156/66 X |
| 4,812,192 | 3/1989 | Woods et al. | 156/66 X |
| 4,890,935 | 1/1990 | Ausnit et al. | 24/399 X |
| 4,957,571 | 9/1990 | Cipolla | 156/66 |
| 5,036,643 | 8/1991 | Bodolay | 156/66 X |

FOREIGN PATENT DOCUMENTS 581864 9/1958 Italy ........................ 24/400

*Primary Examiner*—Laurie K. Cranmer
*Attorney, Agent, or Firm*—Alexander J. McKillop; Charles J. Speciale

[57] ABSTRACT

A thermoplastic bag having a zipper that is operated by a slider is provided with end stops that are integral with the ends of the zipper and prevent the slider from going off past the end of the zipper and coming off the bag. There is also disclosed a method for forming these end stops by ultrasonically smashing the ends of the zipper.

7 Claims, 2 Drawing Sheets

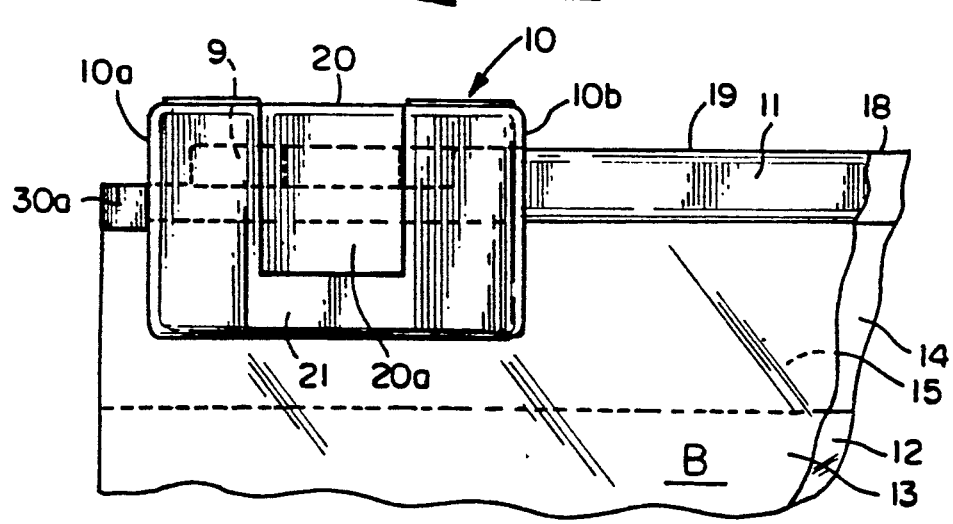
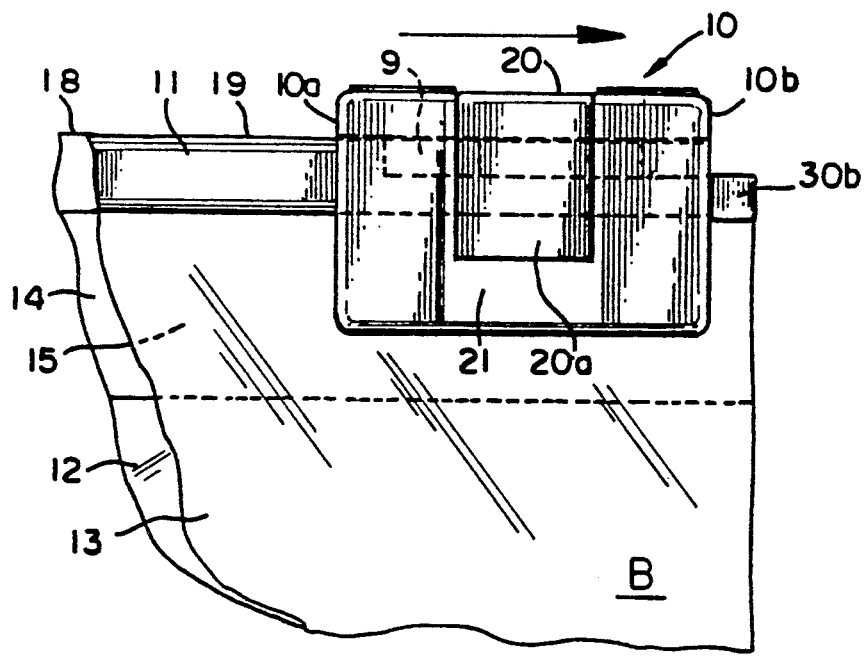

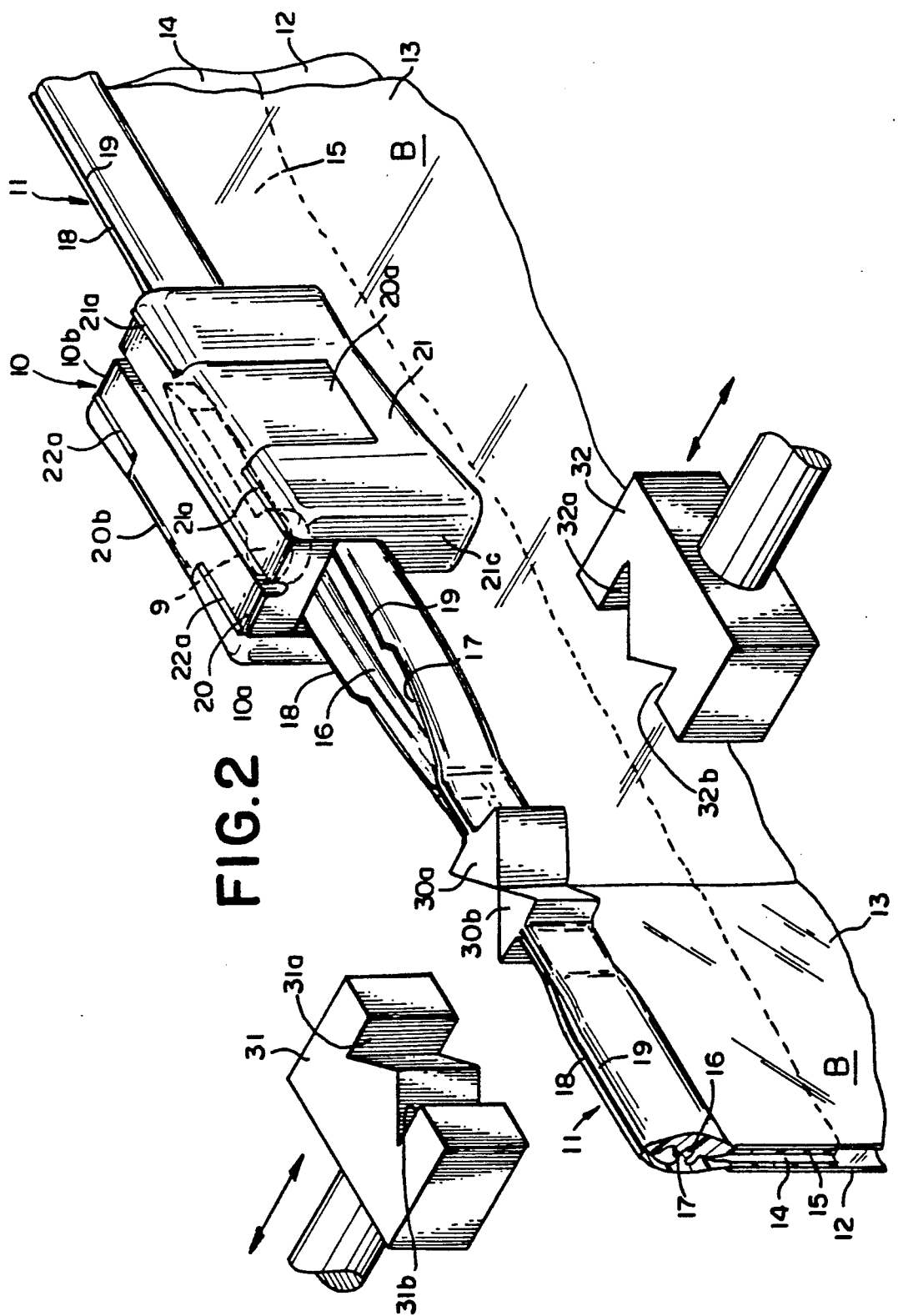

5,131,121

PROTRUDING END STOPS FOR PLASTIC RECLOSABLE FASTENER

BACKGROUND OF THE INVENTION

The present invention relates to plastic reclosable fasteners with sliders for opening and closing the reclosable fasteners on plastic bags and the like and particularly to the provision of protruding end stops on the reclosable fastener to prevent travel of the slider past the ends of the fastener.

Plastic reclosable fasteners or zippers with sliders are well known in the art. The plastic zippers have profiles and include a pair of male and female fastener elements in the form of reclosable interlocking rib and groove elements with a slider for opening and closing the rib and groove elements. In the manufacture of thermoplastic film bags, a pair of these male and female fastener elements extend along the mouth of the bag and these male and female elements are adapted to be secured in any suitable manner to the flexible walls of the thermoplastic film bags. These elements may be integral marginal portions of such walls or they may be extruded separately and thereafter attached to the walls along the mouth of the bag. Various arrangements have been utilized heretofore to maintain the slider on the zipper. In one of the more conventional arrangements the slider includes a separator finger that extends down between the integral locking rib and groove elements as the slider is moved from one edge of the bag to the other edge of the bag. When the bag is opened, the only thing to stop the slider was the side seam at the edge of the bag when the slider finger comes into contact with it. This prior art is described in U.S. Pat. No. 3,790,992. In that patent there is disclosed an improvement wherein the heat seals that join the rib and groove elements are wider at one end than the second edge of the bag and the wider seal being of a width at least equal to the length of the slider from its closing end to the finger so that the slider will remain fully on the bag at the end of its travel when opening the bag. The patent points out that these seal areas provide stops for the slider. Another arrangement for providing stops at the end of the zipper is disclosed in U.S. Pat. No. 3,259,951. In that patent the opposite ends of the interlocking or mating strips are permanently joined or sealed to each other at the ends with stop members sealed between the opposite ends of these members to stop the longitudinal movement of the slider therealong.

It would be desirable to provide a plastic bag having a zipper that is operated by a slider wherein the zipper is terminated with protruding end stops formed from the zipper to prevent the slider from moving off past the ends of the zipper. With this arrangement it is not necessary to add an additional stop element to the zipper nor to rely on the strength of the seam at the edge of the bag for preventing the slider from moving past the ends of the bag.

RELATED APPLICATIONS

A plastic reclosable fastener with end clamps to seal the ends of the fastener and to provide stops to retain the slider on the fastener is disclosed in the related application of F. J. Herrington and Eric A. St. Phillips entitled "End Clamp Stops for Plastic Reclosable Fastener", Ser. No. 673,712 filed Mar. 22, 1991. A plastic reclosable fastener with self-locking slider is disclosed in the related application of F. J. Herrington and Eric A. St. Phillips entitled "Plastic Reclosable Fastener with Self-Locking Slider" Ser. No. 673,707 filed Mar. 22, 1991. The disclosures in these related applications are incorporated herein by this reference thereto. Both of these applications are assigned to the same assignee as the present application.

SUMMARY OF THE INVENTION

It is an object of the present invention to provide a plastic bag having a zipper that is operated by a slider wherein the zipper is terminated with protruding end stops formed from the zipper to engage the slider and prevent the slider from moving off past the ends of the zipper.

In the manufacture of thermoplastic bags and the like having a reclosable fastener extending along the mouth of the bag and a slider straddling the fastener for opening and closing the fastener, the fastener comprising a pair of flexible plastic sheets secured to the facing sidewalls of the bag and having a reclosable interlocking male and female profile elements on the respective strips, the improvement comprises end stop means located at the opposite ends of the reclosable fastener, each of the end stop means being formed from the material at the opposite ends of the reclosable fastener and protruding from the fastener a distance adequate to engage the slider and prevent movement of the slider past the respective ends of the bag.

In accordance with another aspect of the invention there is provided in the manufacture of thermoplastic bags from a pair of superimposed thermoplastic sheets having a top edge with a reclosable fastener extending therealong including a slider for straddling the fastener for opening and closing the fastener, the fastener comprising a pair of flexible plastic strips secured to the facing sidewalls of the bag and having reclosable interlocking male and female profile elements on the respective strips, the method of forming end stops for the slider comprising clamping and sealing together a pair of the flexible plastic strips and the facing sidewalls at a seal area at the ends of the bag to reduce the material thickness of the pair of flexible plastic strips and the facing sidewalls of the bag sandwiched therebetween, and concurrently increasing the thickness of an area of the reclosable fastener adjacent the seal area to provide protruding structure from the fastener thereby providing protruding end stops for preventing movement of the slider past the ends of the bag.

BRIEF DESCRIPTION OF THE DRAWINGS

FIGS. 1a and 1b are fractional elevational views showing the opposite ends of the top of a thermoplastic bag with protruding end stops on the plastic reclosable fastener in accordance with the present invention.

FIG. 2 is a perspective view showing the method of forming the protruding end stops on the plastic reclosable fastener.

DESCRIPTION OF THE PREFERRED EMBODIMENT

Referring to FIGS. 1a, 1b and 2, there is illustrated a thermoplastic bag B having a plastic slider 10 and a profiled plastic reclosable fastener or zipper 11 with end stops 30a, 30b embodying the present invention. The slider 10 and zipper 11 are particularly suited for thermoplastic bags and the like and the slider 10 has been illustrated in FIGS. 1a and 1b assembled on the zipper 11 at the top edge or mouth of a thermoplastic bag B. In FIG. 1a the slider 10 has been illustrated at the left hand end of the zipper 11 which is the closed end. In FIG. 1b the zipper 10 has been illustrated at the right hand end of the zipper 11 which is the opened end of the zipper. In opening and closing the zipper 11 it will be understood that the slider 10 will move from the closed end in FIG. 1a to the opened end in FIG. 1b and vice versa. The bag B may be made from any suitable thermoplastic film such for example as polyethylene or polypropylene or equivalent material. The bag B is formed by a pair of flexible plastic sheets 12 and 13 joined at the bottom and having a top edge, with a pair of flexible plastic strips 14 and 15 having separable plastic means extending along the length thereof comprising reclosable interlocking male and female profile elements in the form of rib and groove elements 16 and 17 on the respective strips to form the zipper 11. This is best shown in FIG. 2. The strips 14 and 15 may be extruded separately and attached to the respective sides of the bag mouth or the strips 14 and 15 may be extruded integral with the sides of the bag mouth. The strips 14 and 15 include profiled tracks 18 and 19 extending along the length thereof and parallel to the rib and groove elements 16 and 17 and the rib and groove elements 16 and 17 preferably have complimentary cross-sectional shapes such that they are closed by pressing the bottom of the elements together first and the rolling the elements to a closed position toward the top thereof. The cross-sectional shapes of the interlocking male and female elements having the rib and groove profiles 16 and 17 are the subject of the invention claimed in the related application of F. J. Herrington entitled "Rolling Action Zipper Profile and Slider Therefor" Ser. No. 490,110 filed Mar. 7, 1990, now U.S. Pat. No. 5,007,143.

It is to be understood that the present invention is not limited to the shapes of the rib and groove profiles illustrated herein and that other shapes can be utilized in connection with the present invention. It is also to be understood that the present invention is not limited to the particular construction of the slider 10 disclosed herein and that other zipper sliders may be utilized in connection with the present invention.

As may be seen in FIG. 2 the slider 10 straddles the zipper 11 at the top of the bag B and is adapted for opening and closing the reclosable fastener elements 16 and 17 of the zipper 11. The slider 10 is formed from a single piece of molded plastic comprising a separator finger 9 and interlocking complimentary structure moving along the zipper 11. The separator finger 9 cooperates with the zipper 11 in such a manner as to provide a self-locking feature for the slider and a leakproof bag. This construction is described in more detail in the aforesaid related application Ser. No. 673,707 . The slider 10 may be molded from any suitable plastic such for example as nylon, polypropylene, polystyrene, Delrin or ABS.

Referring to FIG. 2 it will be seen that the slider 10 is of the foldable type with wings 21 and 22 which have been folded down at the hinge structure 21a and 21b located at the top of the slider body 20 so that the wings are in the folded sidewall position against the edges of the slider body 20. The depending legs 20a and 20b are positioned on the outer side of the strips 14 and 15 and the body 20 of the slider 10 rests on the top of the tracks 18 and 19. When the sidewalls 21 and 22 are in the folded position as shown in FIG. 2 a compression-type latching mechanism (not shown) locks the sidewalls 21 and 22 in folded position with the depending legs 20a and 20b. In this assembled position, the shoulders 21c and 22c (not shown) on the sidewalls 21 and 22 are positioned beneath the bottom of the fastener elements 16 and 17 to prevent the slider 10 from being lifted off the zipper 11. The foldable depending sidewalls 21 and 22 extend from an opening end 10a of the slider 10 to a closing end 10b. It will be noted that the main slider body 20 and the separator finger 9 are wider at the opening end 10a than at the closing end 10b. Similarly the sidewalls 21 and 22 and the depending legs 20a and 20b are spaced wider apart at the opening end 10a of the slider 10 to permit the separation of the rib and groove elements 16 and 17 by the finger 9 engaging the tracks 18 and 19 and are spaced sufficiently close together at the closing end 10b of the slider to press the rib and groove elements 16 and 17 into interlocking relationship as the slider 10 is moved in a fastener closing direction as illustrated by the arrow in FIG. 1a. The arrow in FIG. 1b illustrates movement of the slider 10 in the fastener opening direction.

Referring again to FIGS. 1a and 1b it will be seen that the opposite ends of the zipper 11 are provided with end stops 30a, 30b. Each of the end stops 30a, 30b is formed from the material at the opposite ends of the zipper 11 and protrude from the zipper a distance adequate to engage the slider 10 and prevent the slider from going past the respective ends of the zipper and coming off the bag. The opposite ends of the profile elements 16, 17 of the zipper track are ultrasonically smashed to provide the end stop structure 30a, 30b protruding from the fastener or zipper 11 a distance adequate to engage the slider 10 and prevent movement of the slider past the respective ends of the bag. As may be seen in FIG. 2 a pair of reciprocating anvils 31 and 32 are employed to perform the smashing of the zipper track ends. The anvils 31 and 32 are each provided with cooperating recesses 31a, 31b and 32a, 32b which engage the opposite sides of the zipper 11 and produce protruding bumps on the opposite sides of the zipper ends in the form of end stops 30a and 30b which interfere with the movement of the slider 10 past the ends of the bag. The end stop 30a will engage the opening end 10a of the slider 10 by engaging the end of the shoulder 21c. A double anvil arrangement is shown in FIG. 2 to concurrently ultrasonically smash the other end of the adjacent zipper 11 on the adjacent bag B to produce the end stop 30b. When the slider 10 is moved to the opposite end of the bag as shown in FIG. 1b the closing end 10b of the slider will engage the end stop 30b.

From the foregoing description it will be seen that the end stops 30a and 30b are formed by clamping and sealing together the pair of flexible plastic strips 14, 15 and the facing sidewalls at a seal area at the opposite ends of the bag to reduce the material thickness of the pair of flexible plastic strips and the facing sidewalls of the bag sandwiched therebetween and concurrently increasing the thickness of the adjacent area of the reclosable fastener 11 adjacent the seal area to provide the protruding stop structure 30a and 30b from the fastener thereby providing protruding end stops 30a and 30b for preventing movement of the slider 10 past the ends of the bag. It is to be understood that anvils of other shapes than those illustrated in FIG. 2 may be utilized in producing the protruding structure at the ends of the zipper 11 so long as the end stops are produced from the material at the ends of the zipper. In this way the zipper will be provided with end stops which prevent the slider 10 from going past the end of the zipper and coming off the bag but has eliminated the necessity for providing additional structure separate from the zipper for producing the end stops.

While a preferred embodiment of the invention has been described and illustrated, it is to be understood that further modifications thereof may be made within the scope of the appended claims without departing from the spirit of the invention.

What is claimed is:

1. In the manufacture of thermoplastic bags and the like having a reclosable fastener extending along the mouth of the bag and a slider straddling the fastener for opening and closing the fastener, the fastener comprising a pair of flexible plastic strips secured to the facing side walls of the bag and having reclosable interlocking male and female profile elements on the respective strips, the pair of plastic strips being sealed to each other at the opposite ends of the bag, the improvement comprising:

end stop means located at the opposite ends of said reclosable fastener, each of said end stop means being formed from the material at the opposite ends of said reclosable fastener and protruding transversely from said fastener a distance adequate to engage the slider and prevent movement of the slider past the respective ends of the bag.

2. The improved end stop means according to claim 1 wherein said end stop means protrudes from at least one of the sides of said fastener.

3. The improved end stop means according to claim 2 wherein said end stop means protrudes from both of the sides of said fastener.

4. In the manufacture of thermoplastic bag from a pair of superimposed thermoplastic sheets having a top edge with a reclosable fastener extending therealong including a slider for straddling the fastener for opening or closing the fastener, the fastener comprising a pair of flexible plastic strips secured to the facing sidewalls of the bag and having reclosable interlocking male and female profile elements on the respective strips, the method of forming end stops for the slider comprising:

clamping and sealing together a pair of the flexible plastic strips and the facing side walls at a seal area at the ends of the bag to reduce the material thickness of the pair of flexible plastic strips and the facing side walls of the bag sandwiched therebetween and concurrently increasing the thickness of an adjacent area of the reclosable fastener adjacent the seal area to provide protruding structure from the fastener thereby providing protruding end stops for preventing movement of the slider past the ends of the bag.

5. The method of forming end stops for a slider according to claim 4 wherein the protruding end stops are formed by ultrasonically smashing the adjacent area of the reclosable fastener.

6. The method of forming end stops for a slider according to claim 4 wherein the protruding structure is provided from at least one side of the fastener.

7. The method of forming end stops for a slider according to claim 6 wherein the protruding structure is provided from the opposite sides of the fastener.

* * * * *